(12) United States Patent
Volkmann

(10) Patent No.: US 12,031,045 B2
(45) Date of Patent: Jul. 9, 2024

(54) RADIATION-CURABLE COMPOSITION

(71) Applicant: Marabu GmbH & Co. KG, Tamm (DE)

(72) Inventor: Jürgen Volkmann, Deizisau (DE)

(73) Assignee: Marabu GmbH & Co. KG, Tamm (DE)

( * ) Notice: Subject to any disclaimer, the term of this patent is extended or adjusted under 35 U.S.C. 154(b) by 94 days.

(21) Appl. No.: 17/751,733

(22) Filed: May 24, 2022

(65) Prior Publication Data

US 2022/0380611 A1 Dec. 1, 2022

(30) Foreign Application Priority Data

May 28, 2021 (EP) .................................... 21176630

(51) Int. Cl.
| | |
|---|---|
| *C09D 11/10* | (2014.01) |
| *B41J 11/00* | (2006.01) |
| *B41M 5/52* | (2006.01) |
| *C09D 11/101* | (2014.01) |
| *C09D 11/107* | (2014.01) |
| *C09D 11/30* | (2014.01) |

(52) U.S. Cl.
CPC ....... *C09D 11/101* (2013.01); *B41J 11/00214* (2021.01); *B41M 5/52* (2013.01); *C09D 11/107* (2013.01); *C09D 11/30* (2013.01)

(58) Field of Classification Search
None
See application file for complete search history.

(56) References Cited

U.S. PATENT DOCUMENTS

| | | | |
|---|---|---|---|
| 5,837,750 A | 11/1998 | Szum et al. | |
| 9,879,161 B2 * | 1/2018 | Xia | C09J 5/06 |
| 10,752,538 B1 | 8/2020 | Chisholm et al. | |
| 10,927,036 B2 | 2/2021 | Brückner et al. | |
| 11,174,403 B2 * | 11/2021 | Back | C09D 11/38 |
| 2020/0255682 A1 * | 8/2020 | Tanaka | C09D 11/38 |
| 2022/0403187 A1 * | 12/2022 | Ishijima | C09D 11/40 |
| 2022/0403198 A1 * | 12/2022 | Retailleau | C09D 11/107 |

FOREIGN PATENT DOCUMENTS

| | | | |
|---|---|---|---|
| EP | 2 439 244 A1 | 4/2012 | |
| EP | 3 453 687 A1 | 3/2019 | |
| KR | 102499067 B1 * | 10/2023 | |
| WO | 2016/179213 A1 | 11/2016 | |
| WO | WO-2019132488 A1 * | 7/2019 | B29C 64/112 |

* cited by examiner

*Primary Examiner* — Sanza L. McClendon
(74) *Attorney, Agent, or Firm* — DLA Piper LLP (US)

(57) ABSTRACT

A radiation-curable composition includes at least one monofunctional acrylate monomer and/or methacrylate monomer and/or at least one monofunctional acrylamide monomer, at least one multifunctional acrylate monomer and/or methacrylate monomer and at least one oligomer and/or at least one polymer, wherein the composition at 40° C. has a viscosity of ≥50 mPas, in particular >50 mPas.

18 Claims, No Drawings

RADIATION-CURABLE COMPOSITION

TECHNICAL FIELD

This disclosure relates to a radiation-curable, preferably UV-curable, composition, a method of coating, especially printing, a substrate, a substrate coated, especially printed, with the radiation-cured, preferably UV-cured, composition, a kit for coating, especially printing, a substrate, and a set of inks.

BACKGROUND

To impart structured surfaces to substrates, for example, glasses and bottles, specific casting molds are frequently used. However, that technology is complex and costly and therefore economically viable only in production of large numbers of items.

Consequently, surface structuring is increasingly being produced by digital printing using UV-curable ink compositions. A corresponding method is known, for example, from U.S. Pat. No. 10,752,538 B1.

However, a disadvantage of the known digital printing methods is that print quality, especially in relation to edge sharpness and resolution, is often unsatisfactory. A further problem is that repeated overprinting is generally required, which reduces printing speed. An additional factor is that surface structures applied in that way are frequently found to be insufficiently mechanically robust and/or machine dishwasher-resistant. This is problematic especially in surface-structured bottles and/or glasses.

It could therefore be helpful to provide a radiation-curable, preferably UV-curable, composition that at least partly avoids the disadvantages mentioned in connection with known compositions, a method of coating a substrate, a substrate coated with the radiation-cured, especially UV-cured, composition, a kit for coating, especially printing, a substrate, and a set of inks.

SUMMARY

I provide a radiation-curable composition including at least one monofunctional acrylate monomer and/or methacrylate monomer and/or at least one monofunctional acrylamide monomer, at least one multifunctional acrylate monomer and/or methacrylate monomer, and at least one oligomer and/or at least one polymer, wherein the composition at 40° C. has a viscosity of ≥50 mPas.

I also provide a method of coating or printing a substrate, including a) applying in at least one layer, the radiation-curable composition including at least one monofunctional acrylate monomer and/or methacrylate monomer and/or at least one monofunctional acrylamide monomer, at least one multifunctional acrylate monomer and/or methacrylate monomer, and at least one oligomer and/or at least one polymer, wherein the composition at 40° C. has a viscosity of ≥50 mPas, to a surface of the substrate, and b) curing the radiation-curable composition applied by action of electromagnetic radiation or UV radiation.

I further provide a substrate coated or printed with the radiation-cured or UV-cured composition including at least one monofunctional acrylate monomer and/or methacrylate monomer and/or at least one monofunctional acrylamide monomer, at least one multifunctional acrylate monomer and/or methacrylate monomer, and at least one oligomer and/or at least one polymer, wherein the composition at 40° C. has a viscosity of ≥50 mPas.

DETAILED DESCRIPTION

My radiation-curable, preferably UV-curable, composition comprises:
- at least one monofunctional acrylate monomer and/or at least one methacrylate monomer and/or at least one monofunctional acrylamide monomer,
- at least one multifunctional acrylate monomer and/or at least one methacrylate monomer, and
- at least one oligomer and/or at least one polymer.

It is a particular feature that the radiation-curable, preferably UV-curable, composition at 40° C. has a viscosity of ≥(in words: greater than or equal to) 50 mPas, in particular >(in words: greater than) 50 mPas.

The radiation-curable, preferably UV-curable, composition is preferably a radiation-curable, preferably UV-curable, ink composition or varnish composition, especially clear varnish composition or overprint varnish composition.

The expression "radiation-curable, preferably UV-curable, composition" means a composition that can be cured under the action of electromagnetic radiation, preferably ultraviolet radiation (UV radiation).

The expression "radiation-curable, preferably UV-curable, ink composition" means an ink composition that can be cured under the action of electromagnetic radiation, preferably ultraviolet radiation (UV radiation).

The expression "radiation-curable, preferably UV-curable, varnish composition, especially clear varnish composition or overprint varnish composition" means a varnish composition, especially clear varnish composition or overprint varnish composition, that can be cured under the action of electromagnetic radiation, preferably ultraviolet radiation (UV radiation).

The expression "ink composition" means a colored, especially intensely colored, and coloring composition in liquid form, especially in the form of a dispersion, suspension or solution.

The expression "varnish composition" means a coating composition which is applied, preferably thinly, to articles and built up by chemical and/or physical processes, for example, evaporation of solvents and subsequent drying, thermally induced curing by chemical reactions or light-induced curing by chemical reactions, especially UV light-induced photochemical polymerization, to give a film, especially a continuous solid film. More particularly, a varnish composition may be a coating composition that absorbs or does not absorb electromagnetic radiation. More particularly, a varnish composition may be free of pigment and or dye, especially free of colorant, or include colorant, especially pigments and/or dyes.

The expression "clear varnish composition" means a transparent, i.e., light-transmissive, varnish composition, especially one that transmits electromagnetic radiation or electromagnetic waves having a wavelength of 380 nm to 780 nm.

The expression "overprint varnish composition" means a coating composition which is applied to a substrate and creates particular mechanical and/or optical properties, especially surface structuring. More particularly, the expression "overprint varnish composition" may mean a coating composition having properties of a clear varnish composition.

The expression "ultraviolet radiation (UV radiation)" means radiation within a wavelength range from 100 nm to 450 nm, preferably 200 nm to 450 nm, especially 360 nm to 450 nm, especially 380 nm to 450 nm.

The expression "monofunctional acrylate monomer" means a monomer having only one acrylate group or acryloyl group The expression "monofunctional methacrylate monomer" means a monomer having only one methacrylate group or methacryloyl group.

The expression "multifunctional acrylate monomer" means a monomer having a multitude of acrylate groups or acryloyl groups, i.e., two or more, for example, three, four or five, acrylate groups or acryloyl groups.

The expression "multifunctional methacrylate monomer" means a monomer having a multitude of methacrylate groups or methacryloyl groups, i.e., two or more, for example, three, four or five, methacrylate groups or methacryloyl groups.

The expression "monofunctional acrylamide monomer" means a monomer having only one acrylamide group.

The expression "at least one monofunctional acrylate monomer" may mean only one monofunctional acrylate monomer, i.e., only one type of monofunctional acrylate monomer, or a multitude of different monofunctional acrylate monomers or acrylate monomer types.

The expression "at least one monofunctional methacrylate monomer" may mean only one monofunctional methacrylate monomer, i.e., only one type of monofunctional methacrylate monomer, or a multitude of different monofunctional methacrylate monomers or methacrylate monomer types.

The expression "at least one multifunctional acrylate monomer" may mean only one multifunctional acrylate monomer, i.e., only one type of multifunctional acrylate monomer, or a multitude of different multifunctional acrylate monomers or acrylate monomer types.

The expression "at least one multifunctional methacrylate monomer" may mean only one multifunctional methacrylate monomer, i.e., only one type of multifunctional methacrylate monomer, or a multitude of different multifunctional methacrylate monomers or methacrylate monomer types.

The expression "at least one multifunctional acrylamide monomer" may mean only one multifunctional acrylamide monomer, i.e., only one type of multifunctional acrylamide monomer, or a multitude of different multifunctional acrylamide monomers or acrylamide monomer types.

The expression "at least one oligomer" may mean only one oligomer, i.e., only one type of oligomer, or a multitude of different oligomers or oligomer types.

The expression "at least one polymer" may mean only one polymer, i.e., only one type of polymer, or a multitude of different polymers or polymer types.

The expression "reactive oligomer" means a polymerizable or polymerization-capable oligomer which can be reacted especially under the action of electromagnetic radiation, preferably ultraviolet radiation (UV radiation), especially in the presence of a photoinitiator, and can especially take part in polymerization reactions, preferably free-radical polymerization reactions, and/or crosslinking reactions under partial or complete curing of the composition. The "reactive oligomer" is preferably an oligomer which is polymerizable or polymerization-capable under the action of electromagnetic radiation, preferably ultraviolet radiation (UV radiation), especially in the presence of a photoinitiator. Alternatively or additionally, the "reactive oligomer" may be provided for adjustment of the viscosity, especially of a viscosity suitable for digital printability, of the composition.

The expression "viscosity" preferably means a shear viscosity. This means the resistance of the composition to shear. The viscosity is preferably measured with a viscometer, especially to EN ISO 3219. In particular, the viscosity can be determined or measured via a rheometer, for example, MCR 302 rheometer (manufacturer: Anton Paar), at 40° C. at a shear rate of 2000 $s^{-1}$.

My compositions, on account of their significantly elevated viscosity compared to known compositions, has the particular advantage that it has only a minor tendency, if any, to run after application to a substrate. As a result, improved print quality is achievable, especially in relation to edge sharpness and resolution. On top of that, application of a smaller number of layers is sufficient to achieve a desired total layer thickness of the composition, especially after curing thereof, on the substrate. This advantageously also leads to an increase in print speed.

My compositions are based more particularly on the surprising finding that the use of monofunctional acrylate monomers and/or monofunctional methacrylate monomers can reduce cracking of a film formed by curing of the composition of a substrate surface or at least significantly reduce the risk of such cracking. This in turn advantageously increases mechanical stability and especially machine dishwasher stability of the composition.

A further surprising effect of the compositions is that the use of multifunctional acrylate monomers and/or multifunctional methacrylate monomers can significantly increase the resistance of the compositions to alcohols, especially ethanol. This is particularly advantageous with regard to substrates to be coated, especially to be printed, for example, bottles or glasses that come into contact with alcohols, especially ethanol, when they are used as intended.

The radiation-curable, preferably UV-curable, composition at 40° C. may have a viscosity of 50 mPas to 150 mPas, especially 50 mPas to 125 mPas, preferably 50 mPas to 100 mPas. The values disclosed in this paragraph for the viscosity of the composition result in particularly striking manifestation of the abovementioned advantages.

The at least one monofunctional acrylate monomer and/or methacrylate monomer may be selected from the group consisting of 2-phenoxyethyl acrylate, isobornyl acrylate, n-octyldecyl acrylate, cyclic trimethylol-propane formal acrylate, lauryl acrylate, alkoxylated lauryl acrylate such as ethoxylated lauryl acrylate, isodecyl acrylate, caprolactone acrylate, 3,3,5-trimethylcyclohexyl acrylate, 4-hydroxybutyl acrylate, isooctyl acrylate, 2-(2-ethoxyethoxy)ethyl acrylate, butyl acrylate, benzyl acrylate, 2-(1,1-dimethylethyl)cyclohexyl acrylate, 3-(1,1-dimethylethyl)cyclohexyl acrylate, 4-(1,1-dimethylethyl)cyclohexyl acrylate, ethoxylated phenyl acrylate, alkoxylated nonylphenol acrylate, O-phenylphenoxyethyl acrylate, phenoxybenzyl acrylate, trimethylcyclohexyl acrylate, tridecyl acrylate, 4-tert-butylcyclohexyl acrylate, behenyl acrylate, stearyl acrylate, isobornyl methacrylate, 4-tert-butylcyclohexyl methacrylate, lauryl methacrylate, isodecyl methacrylate, 2-phenoxyethyl methacrylate, isooctyl methacrylate, benzyl methacrylate, cyclohexyl methacrylate, 3,3,5-trimethylcyclohexyl methacrylate, alkoxylated nonylphenol methacrylate, hydroxyethyl methacrylate, 2-N-morpholinoethyl methacrylate and mixtures of at least two of the aforementioned monofunctional acrylate monomers and/or methacrylate monomers.

Moreover, the radiation-curable, preferably UV-curable, composition may have a proportion of the at least one monofunctional acrylate monomer and/or at least one monofunctional methacrylate monomer, based on the total weight of the radiation-curable, preferably UV-curable, composition which is higher than a proportion of the at least one multifunctional acrylate monomer and/or at least one multifunctional methacrylate monomer, based on the total weight of the radiation-curable, preferably UV-curable, composition.

The at least one monofunctional acrylate monomer and/or at least one monofunctional methacrylate monomer and/or at least one monofunctional acrylamide monomer, especially collectively, may have a proportion of 20% by weight to 80% by weight, especially 30% by weight to 70% by weight, preferably 40% by weight to 60% by weight, based on the total weight of the radiation-curable, preferably UV-curable, composition.

The at least one multifunctional acrylate monomer and/or methacrylate monomer may be selected from the group consisting of (octahydro-4,7-methano-1H-indenediyl)bis (methylene) diacrylate, tricyclodecane-dimethanol diacrylate, butanediol diacrylate, 1,2-ethylene glycol diacrylate, dodecane-1,12-diol diacrylate, decane-1,10-diol diacrylate, esterdiol diacrylate, propoxylated 2-neopentyl glycol diacrylate, tris(2-hydroxyethyl) isocyanurate triacrylate, propoxylated neopentyl glycol diacrylate, hexanediol diacrylate, tripropylene glycol diacrylate, tetraethylene glycol diacrylate, dipropylene glycol diacrylate, alkoxylated hexanediol diacrylate, 3-methylpentane-1,5-diol diacrylate, alkoxylated cyclohexane-dimethanol diacrylate, tricyclodecane-dimethanol diacrylate, trimethylolpropane triacrylate, alkoxylated trimethylolpropane triacrylate, ethoxylated trimethylolpropane triacrylate, glycerol propoxylate triacrylate, pentaerythritol triacrylate, dipentaerythritol pentaacrylate, dipentaerythritol hexaacrylate, ethoxylated pentaerythritol tetraacrylate, pentaerythritol tetraacrylate, ditrimethylolpropane tetraacrylate, polyethylene glycol diacrylates, 1,2-ethylene glycol dimethacrylate, dodecane-1, 12-diol dimethacrylate, tris(2-hydroxyethyl) isocyanurate trimethacrylate, hexanediol dimethacrylate, ethoxylated bisphenol A dimethacrylate, trimethylolpropane trimethacrylate, pentaerythritol tetramethacrylate and mixtures of at least two of the aforementioned multifunctional acrylate monomers and/or methacrylate monomers.

The at least one multifunctional acrylate monomer and/or at least one multifunctional methacrylate monomer, especially collectively, may have a proportion of 5% by weight to 40% by weight, especially 5% by weight to 30% by weight, preferably 5% by weight to 25% by weight, based on the total weight of the radiation-curable, preferably UV-curable, composition.

The at least one monofunctional acrylate monomer and/or at least one monofunctional methacrylate monomer and/or at least one monofunctional acrylamide monomer and the at least one multifunctional acrylate monomer and/or at least one multifunctional methacrylate monomer collectively have a proportion of 40% by weight to 90% by weight, especially 50% by weight to 80% by weight, preferably 60% by weight to 70% by weight, based on the total weight of the radiation-curable, preferably UV-curable, composition.

The monofunctional acrylamide monomer may be 4-acryloylmorpholine (ACMO).

The radiation-curable, preferably UV-curable, composition may further comprise at least one N-vinylamide monomer and/or at least one vinyl acrylate monomer, especially selected from the group consisting of N-vinylcaprolactam, N-vinylpyrrolidone, vinylmethyl-oxazolidinone (VMOX), 2-(2-vinyloxyethoxy)ethyl acrylate (VEEA), 2-(2-vinyloxyethoxy)ethyl methacrylate and mixtures of at least two of the aforementioned monomers.

The at least one oligomer at 40° C. may have a viscosity of 2000 mPas to 20000 mPas, especially 3000 mPas to 15000 mPas, preferably 4000 mPas to 10000 mPas. Such an oligomer may also be referred to as high-viscosity oligomer. The use of such an oligomer can (additionally) minimize the risk of running of the composition after it has been applied to a substrate.

The at least one oligomer may have a proportion of 10% by weight to 50% by weight, especially 20% by weight to 50% by weight, preferably 20% by weight to 40% by weight, based on the total weight of the radiation-curable, preferably UV-curable, composition. The benefit described in relation to the above configuration accrues mutatis mutandis.

The at least one oligomer preferably has a molecular weight, especially weight-average molecular weight, of 500 Da to 10000 Da, especially 1500 Da to 8000 Da, preferably 2500 Da to 5500 Da. The molecular weight, especially weight-average molecular weight, is preferably determined by gel permeation chromatography, especially with polystyrene as standard.

The at least one oligomer may be at least one reactive oligomer, especially at least one acrylate oligomer and/or at least one methacrylate oligomer.

The expression "at least one reactive oligomer" may mean only one reactive oligomer, i.e., only one type of reactive oligomer, or a multitude of different reactive oligomers or oligomer types. Correspondingly, the expression "at least one acrylate oligomer" may mean only one acrylate oligomer, i.e., only one type of acrylate oligomer, or a multitude of different acrylate oligomers or oligomer types. Correspondingly, the expression "at least one methacrylate oligomer" may mean only one methacrylate oligomer, i.e., only one type of methacrylate oligomer, or a multitude of different methacrylate oligomers or oligomer types.

Moreover, the radiation-curable, preferably UV-curable, composition, apart from the at least one acrylate oligomer and/or the at least one methacrylate oligomer, may not comprise any other reactive oligomer.

The expression "acrylate oligomer" means an oligomer having at least one acryloyl group (called a monofunctional acrylate oligomer) or a multitude of acryloyl groups (called a multifunctional acrylate oligomer).

The expression "methacrylate oligomer" means an oligomer having at least one methacryloyl group (called a monofunctional methacrylate oligomer) or a multitude of methacryloyl groups (called a multifunctional methacrylate oligomer).

The at least one oligomer, especially at least one reactive oligomer, is preferably at least one acrylate oligomer and/or at least one methacrylate oligomer selected from the group consisting of epoxy acrylates, polyester acrylates, aliphatic urethane acrylates, aromatic urethane acrylates, polyether acrylates, silicone acrylates, melamine acrylates, dendritic acrylates, amine-modified acrylates, epoxy methacrylates, polyester methacrylates, aliphatic urethane methacrylates, aromatic urethane methacrylates, polyether methacrylates, silicone methacrylates, melamine methacrylates, dendritic methacrylates, amine-modified methacrylates and mixtures of at least two of the aforementioned oligomers, especially reactive oligomers, preferably acrylate oligomers and/or methacrylate oligomers.

For example, the at least one oligomer, especially at least one reactive oligomer, may preferably be at least one acrylate oligomer and/or at least one methacrylate oligomer selected from the group consisting of urethane acrylates, methoxy polyethylene glycol monoacrylate, polyethylene glycol diacrylate, amine-modified polyether acrylates, urethane methacrylates, methoxy polyethylene glycol monomethacrylate, polyethylene glycol dimethacrylate, amine-modified polyether methacrylates and mixtures of at least two of the aforementioned oligomers, especially reactive oligomers, preferably acrylate oligomers and/or methacrylate oligomers.

The radiation-curable, preferably UV-curable, composition may have a proportion of the at least one monofunctional acrylate monomer and/or at least one monofunctional methacrylate monomer and/or at least one monofunctional acrylamide monomer and of the at least one multifunctional acrylate monomer and/or at least one multifunctional methacrylate monomer to the at least one oligomer of <(in words: less than) 4:1, especially 1.5:1 to 3.5:1, preferably 2:1 to 3.5:1. By virtue of the proportions disclosed in this paragraph, it is advantageously possible to achieve a viscosity and hence printing characteristics, especially in the inkjet printing method, that lead to particularly good edge sharpness of the layers applied in printing of the composition onto a substrate.

The at least one polymer may have a molecular weight, especially weight-average molecular weight, of ≥(in words: not less than) 30000 Da, especially 30000 Da to 100000 Da, preferably 40000 Da to 70000 Da. The molecular weight, especially weight-average molecular weight, is preferably determined by gel permeation chromatography, especially with polystyrene as standard.

The at least one polymer may have a glass transition temperature of 25° C. to 105° C., especially 25° C. to 90° C., preferably 40° C. to 90° C., more preferably 40° C. to 80° C.

The at least one polymer may have a proportion of 10% by weight to 50% by weight, especially 20% by weight to 50% by weight, preferably 20% by weight to 40% by weight, based on the total weight of the radiation-curable, preferably UV-curable, composition. The benefit described in relation to the above configuration accrues mutatis mutandis.

Moreover, the at least one oligomer and the at least one polymer may collectively have a proportion of 10% by weight to 50% by weight, especially 20% by weight 50% by weight, preferably 20% by weight 40% by weight, based on the total weight of the radiation-curable, preferably UV-curable, composition.

The at least one polymer may be at least one passive, i.e., non-radiation-curable, preferably non-UV-curable, polymer and/or at least one active, i.e., radiation-curable, preferably UV-curable, polymer. The at least one polymer is preferably at least one resin, especially at least one solid resin, i.e., just one resin, especially solid resin, or a multitude of different resins, especially solid resins.

The expression "resin" means liquid or solid organic polymers, especially as base materials for plastics.

The expression "at least one resin" may mean only one resin, i.e., only one type of resin, or a multitude of different resins or resin types.

The expression "solid resin" refers to organic polymers that are solid, i.e., not liquid, at room temperature, especially at a temperature of 15° C. to 25° C.

The expression "at least one solid resin" may mean only one solid resin, i.e., only one type of solid resin, or a multitude of different solid resins or solid resin types.

Moreover, the radiation-curable, preferably UV-curable, composition, apart from the at least one passive, i.e., non-radiation-curable, preferably non-UV-curable, polymer and/ or the at least one active, i.e., radiation-curable, preferably UV-curable, polymer, may not comprise any other polymer.

Preferably, the at least one polymer may be at least one passive resin, especially passive solid resin, preferably selected from the group consisting of epoxy resin, polyester resin, vinyl resin, ketone resin, aldehyde resin, nitrocellulose resin, phenoxy resin, acrylate resin and mixtures of at least two of the aforementioned resins.

Moreover, the radiation-curable, preferably UV-curable, composition may comprise at least one photoinitiator, especially one of Norrish type I and/or of Norrish type II.

The expression "at least one photoinitiator" may mean only one photoinitiator, i.e., only one type of photoinitiator, or a multitude of different photoinitiators or photoinitiator types.

The expression "Norrish type I photoinitiator" means a photoinitiator which breaks down into two free radicals under the action of electromagnetic radiation, preferably ultraviolet radiation (UV radiation), usually as a result of what is called alpha scission. The free radicals formed can trigger a chain polymerization and/or crosslinking with partial or complete curing of the radiation-curable, preferably UV-curable, composition.

The expression "Norrish type II photoinitiator" means a photoinitiator capable of abstracting a hydrogen atom from an adjacent molecule. This can then trigger a chain polymerization and/or crosslinking with partial or complete curing of the radiation-curable, preferably UV-curable, composition.

The at least one photoinitiator may especially be selected from the group consisting of ethyl 2,4,6-trimethylbenzoyl phenylphosphinate, isobutyldibenzoyl-phosphine oxide, diphenyl(2,4,6-trimethylbenzoyl)-phosphine oxide, 1-methyl-(2,6-dimethoxybenzoyl)phenylphosphine oxide, methyl isobutyryl methylphosphinate, isopropyl pivaloyl phenylphosphinate, methyl p-toluoyl phenylphosphinate, methyl o-toluoyl phenylphosphinate, isopropyl p-tert-butylbenzoyl phenylphosphinate, methyl acryloylphenylphosphinate, o-toluoylphenylphosphine oxide, vinyl pivaloyl phenylphosphinate, methyl pivaloyl phenylphosphinate, isopropyl pivaloyl phenylphosphinate, bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)ethylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-di-methylphenylphosphine oxide, bis (2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthyl)-2,5-dimethylphenylphosphine oxide, bis(2-methyl-1-naphthyl)-4-ethoxyphenylphosphine oxide, bis(2-methyl-1-naphthyl)-2-naphthylphosphine oxide, bis (2-methyl-1-naphthyl)-4-propylphenylphosphine oxide, bis (2-methyl-1-naphthyl)-2,5-trimethylphenylphosphine oxide, bis(2-methoxy-1-naphthyl)-4-ethoxyphenyl-phosphine oxide, bis(2-chloro-1-naphthyl)-2,5-dimethyl-phenylphosphine oxide, bis(2,6-dimethoxybenzoyl)-2,4,6-trimethylpentylphosphine oxide and mixtures of at least two of the aforementioned photoinitiators.

Alternatively, or in combination, the at least one photoinitiator may be a compound having Formula (I):

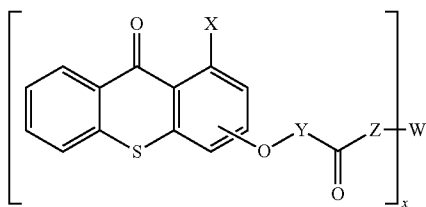

where
X is a halogen atom,
Y is an alkylene or alkenylene group,
Z is a group of the formula —[OCH$_2$CH$_2$]$_y$—, —[OCH$_2$CH$_2$CH$_2$CH$_2$]$_y$— or —[CH(CH$_3$)CH$_2$]$_y$—, where y is a number, especially an integer, from 1 to 20, especially 1 to 10, or Z is a group of the formula —[O(CH$_2$)$_b$CO]$_y$— or —[O(CH$_2$)$_b$CO]$_{(y-1)}$—[O(CHR″CHR′)$_a$]—, where b is a number, especially an integer, from 4 to 5 and y is a number, especially an integer, from 1 to 20, especially 1 to 10,
W is a residue of a polyhydroxy compound, and
x is a number, especially an integer, of >(in words: greater than) 1, where moieties bonded to the W group may be the same or different.

Preferably, X in Formula (I) is a chlorine atom. Alternatively, X in Formula (I) may be a fluorine, bromine or iodine atom. In addition, Y in Formula (I) may be an alkylene or alkenylene group having one carbon atom to twelve carbon atoms, especially one carbon atom to ten carbon atoms, preferably one carbon atom to six carbon atoms. Preferably, Y in Formula (I) is a methylene group, i.e., a —CH$_2$— group. Further preferably, Z in Formula (I) is a —[OCH(CH$_3$)CH$_2$]$_y$— group where y is a number, especially an integer, from 1 to 20, especially 1 to 10. In addition, W in Formula (I) is preferably a residue of pentaerythritol, i.e., a residue of 2,2-bis(hydroxymethyl)propane-1,3-diol. Alternatively, W in Formula (I) may be a residue of ethylene glycol, propylene glycol, butylene glycol, glycerol, trimethylolpropane, ditrimethylolpropane or dipentaerythritol. Preferably, the —YCO—Z— moiety in the at least one photoinitiator compound of Formula (I) may be bonded to the thioxanthone moiety in a para position relative to the position of X.

In particular, the at least one photoinitiator may have Formula (Ia):

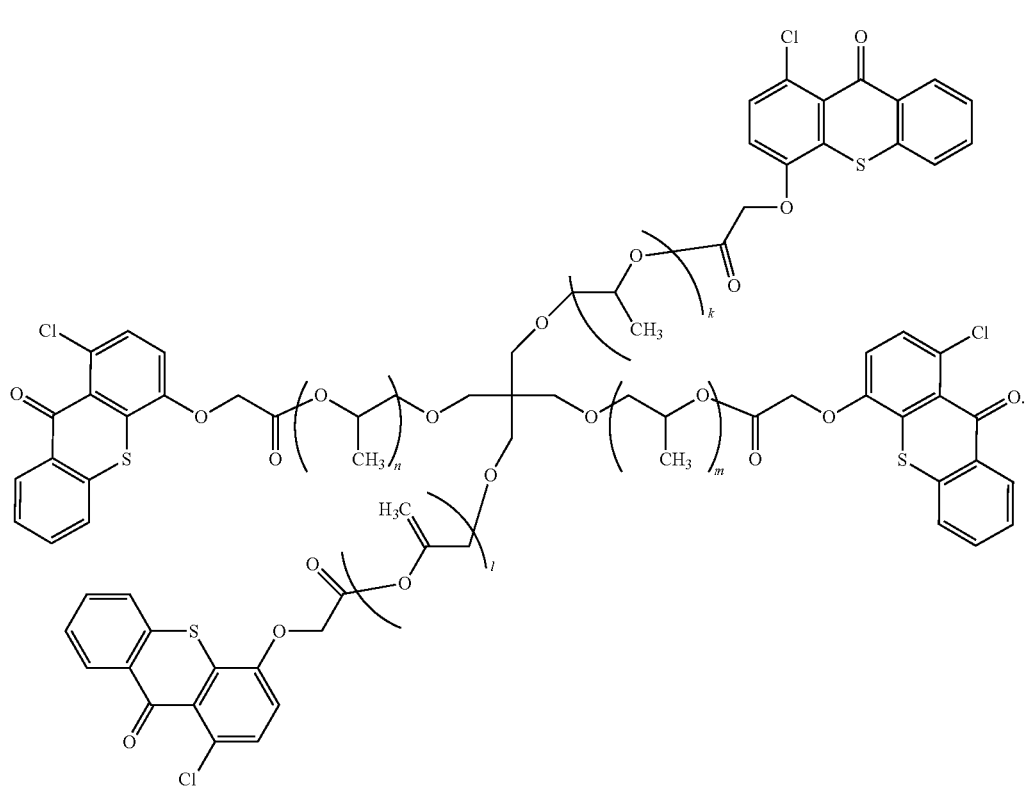

Moreover, the radiation-curable, preferably UV-curable, composition may comprise at least one pigment, especially at least one color pigment and/or at least one effect pigment.

The expression "at least one pigment, especially at least one color pigment and/or at least one effect pigment" may mean only one pigment, i.e., only one type of pigment, especially color pigment and/or effect pigment, or a multitude of different pigments or pigment types, especially color pigments and/or effect pigments or color pigment types and/or effect pigment types.

The at least one color pigment may be selected from the group consisting of inorganic pigments, organic pigments, hollow sphere pigments, for example, polymeric hollow sphere pigments, aluminium pigments, for example, coated aluminium pigments, and mixtures of at least two of the aforementioned pigments.

The inorganic pigments may especially be selected from the group consisting of titanium dioxide, carbon black, bismuth pigments, oxides, hydroxides, Prussian blue, ultramarine, molybdates, iron oxide pigments, chromium oxide, mixed phase oxide pigments, for example, Rinman's green, and mixtures of at least two of the aforementioned inorganic pigments.

The organic pigments may especially be selected from the group consisting of pigments based on quinacridones, pigments based on isoindolines, pigments based on phthalocyanines, pigments based on benzimidazolones, azo pigments, monoazo pigments, diazo pigments, polycyclic pigments and mixtures of at least two of the aforementioned organic pigments.

The coated aluminium pigments may, for example, have a phosphorus-containing and especially fluorine compound-free coating. Through the use of coated aluminium pigments, it is advantageously possible to impart a metallic effect to the radiation-curable, preferably UV-curable, composition.

The expression "effect pigment" means a pigment that imparts additional properties, for example, angle-dependent changes in hue and/or gloss (flop effect) and/or texture to a system in which it is embedded.

The at least one effect pigment may especially be at least one pearlescent pigment and/or at least one interference pigment, especially selected from the group consisting of pearl essence, basic lead carbonate, bismuth oxide chloride, iron oxide red in platelet form, titanium dioxide in platelet form, organic pigments in platelet form, metal oxide-mica pigments, aluminium oxide flakes, borosilicate flakes, silicon dioxide flakes, metal oxide-coated metal platelets, multilayer pigments (Fabry-Perot structure), liquid-crystal pigments, structured effect pigments and mixtures of at least two of the aforementioned pigments.

Moreover, the at least one pigment may have a proportion of 0.1% by weight to 50% by weight, especially 0.1% by weight to 30% by weight, preferably 0.1% by weight to 20% by weight, based on the total weight of the radiation-curable, preferably UV-curable, composition.

Moreover, the radiation-curable, preferably UV-curable, composition may be free of any pigment, especially chromatic and/or achromatic pigment, and/or free of any dye, especially chromatic and/or achromatic dye.

Moreover, the radiation-curable, preferably UV-curable, composition may be free of water and/or any organic solvent. More particularly, the radiation-curable, preferably UV-curable, composition, apart from the at least one monofunctional acrylate monomer and/or at least one monofunctional methacrylate monomer and/or at least one monofunctional acrylamide monomer and the at least one multifunctional acrylate monomer and/or at least one multifunctional methacrylate monomer, may be solvent-free.

Preferably, the radiation-curable, preferably UV-curable, composition may be used for coating, especially printing, preferably digital printing, more preferably inkjet printing, of substrates (print substrates or print carriers), especially made of glass, plastic, paper, paperboard, ceramic, metal or a combination of at least two of the aforementioned materials. The substrates may especially be configured in the form of bottles, glasses such as drinking glasses, advertising panels, toys, banners, films, sheet metal panels, textiles, packaging such as food packaging, furniture, glass panes or floors.

Moreover, the radiation-curable, preferably UV-curable, composition may be used for coating of grip zones, production of anti-slip coatings, optical applications and effects, creation of Braille, photovoltaics or positioning aids.

I also provide a method of coating, especially printing, preferably digital printing, more preferably inkjet printing, of a substrate, i.e., a print substrate or print carrier. The method comprises:

a) applying, especially in layers, a radiation-curable, preferably UV-curable, composition, especially my composition, to a surface of the substrate, and b) curing the radiation-curable, preferably UV-curable, composition applied, especially in layers, by the action of electromagnetic radiation, especially of UV radiation.

The radiation-curable, preferably UV-curable, composition may in principle be applied to the surface of the substrate only selectively or partly, i.e., only in regions or sections, or completely, i.e.; fully or continuously.

In the performance of step a), it is possible to apply just one layer or a multitude of layers of the radiation-curable, preferably UV-curable, composition to the surface of the substrate.

Moreover, step a) and/or step b) may be performed repeatedly, especially once to 25 times, preferably 4 times to 15 times.

In multilayer application of the radiation-curable, preferably UV-curable, composition to the surface of the substrate, the radiation-curable, preferably UV-curable, composition may be cured after application of every individual layer or after complete application, i.e., after application of all layers, of the radiation-curable, preferably UV-curable, composition to the surface of the substrate.

Moreover, for performance of step b), it is possible to use a mercury vapor lamp or a UV light-emitting diode (UV-LED). With the aid of the mercury vapor lamp, it is preferably possible to generate UV radiation with a wavelength range from 200 nm to 450 nm. With the aid of the UV light-emitting diode, it is preferably possible to generate UV radiation within a wavelength range from 360 nm to 450 nm.

Moreover, individual layers of the radiation-curable, preferably UV-curable, composition applied may not be fully cured, especially with the UV light-emitting diode. Instead, merely UV pinning of the individual layers may at first be effected. In UV pinning, a dose of ultraviolet (UV) light of low intensity is applied to a UV-curable composition. The result is that the UV-curing composition is converted to a higher viscosity state but does not completely cure. This is also referred to as "gelating."

Moreover, after step b), conclusive curing can be effected by the action of UV radiation. This can be effected by a UV light-emitting diode having high radiation intensity and/or a mercury vapor lamp.

Preference is given to applying the radiation-curable, preferably UV-curable, composition to the surface of the substrate in a digital printing method, especially inkjet printing method.

The expression "digital printing method" means a printing method in which the printed image is transferred directly from a computer to a printing machine without utilization of a static or fixed printing form.

The expression "inkjet printing method" means a method in which small droplets of liquid ink are generated and applied to a substrate. A first option is to generate a continuous inkjet (CIJ), and a second option is to discontinuously generate individual droplets that are produced and applied to the substrate only as required (drop on demand, DOD).

Moreover, prior to application of the radiation-curable, preferably UV-curable, composition, a primer composition or underprint varnish composition may be applied to at least part of the surface of the substrate in layers, especially in the form of one or more layers, and then the radiation-curable, preferably UV-curable, composition may be applied in the form of one or more layers to the primer composition or underprint varnish composition applied to the surface of the substrate. It is likewise possible here in principle for the primer composition or underprint varnish composition to be applied only selectively or partly, i.e., only in sections or regions, or completely, i.e., fully or continuously, to the surface of the substrate. The primer composition or underprint varnish composition may be a radiation-curable, preferably UV-curable, or solvent-based primer composition or underprint varnish composition. More particularly, the primer composition may be a UV-curing primer composition as described in EP 3 453 687 A1. The disclosure-content of the EP '687 in relation to the UV-curing primer composition described therein is incorporated herein by explicit reference.

Moreover, the substrate may be pretreated, preferably to alter its surface properties, prior to the application of the radiation-curable, preferably UV-curable, composition and/or prior to the application of the radiation-curable, preferably UV-curable, primer composition. For example, the substrate may be pretreated by flame treatment and/or flame pyrolysis coating, especially silicatizing. Such a pretreatment may be appropriate, for example, when the substrate consists of glass.

With regard to further features and advantages of the method, for avoidance of repetition, reference is made completely to the remarks made in the context of my compositions. The features and advantages described therein, especially in relation to the radiation-curable, preferably UV-curable, composition are also applicable mutatis mutandis to my methods.

I further provide a substrate, i.e., a print substrate or print carrier, that has been coated, especially printed, preferably digitally printed, more preferably inkjet-printed, with a radiation-cured, preferably UV-cured, my composition. It is possible here for the substrate to have been coated, especially printed, preferably digitally printed, more preferably inkjet-printed, only partly, i.e., only in sections or regions, or completely, i.e., fully or continuously, with the radiation-cured, preferably UV-cured, composition.

Preferably, the radiation-cured, preferably UV-cured, composition is formed in multiple layers on the substrate, i.e., on one surface of the substrate.

Further preferably, the radiation-cured, preferably UV-cured, composition has a layer thickness of 0.3 mm to 2 mm on the substrate.

Further preferably, the radiation-cured, preferably UV-cured, composition has a glass transition temperature of 20° C. to 70° C., especially 20° C. to 45° C., preferably 25° C. to 40° C.

More preferably, the radiation-cured, preferably UV-cured, composition stands out from the surface of the substrate in the manner of a relief or in a tactile manner.

The substrate may include glass, plastic, paper, paperboard, ceramic, metal or a combination of at least two of the aforementioned materials, or consist of glass, plastic, paper, paperboard, ceramic, metal or a combination of at least two of the aforementioned materials. More particularly, the substrate may be configured as a bottle, glass such as drinking glass, advertising panel, toy, banner, film, sheet metal panel, textile, packaging such as food packaging, furniture item, glass pane or floor.

With regard to further features and advantages of the substrate, for avoidance of repetition, reference is likewise made completely to the description so far, especially to the remarks made in the context of my compositions. The features and advantages described therein, especially in relation to the radiation-curable, preferably UV-curable, composition are also applicable mutatis mutandis to my substrate.

I still further provide the use of a radiation-curable, preferably UV-curable, composition for coating, especially printing, preferably digital printing, more preferably inkjet printing, of a substrate.

With regard to further features and advantages of the use, for avoidance of repetition, reference is likewise made completely to the description so far, especially to the remarks made in the context of my compositions. The features and advantages described therein, especially in relation to the radiation-curable, preferably UV-curable, composition and the substrate are also applicable mutatis mutandis to the use.

I yet further provide a kit or system, especially for coating, especially printing, preferably digital printing, more preferably inkjet printing, of a substrate, i.e., a print substrate or print carrier.

The kit or system comprises the following, spatially separated from one another:
 at least one radiation-curable, preferably UV-curable, composition, especially just one radiation-curable, preferably UV-curable, composition or a multitude of radiation-curable, preferably UV-curable, compositions, i.e., two or more, for example, three, four or five, radiation-curable, preferably UV-curable, compositions, and
 at least one further component.

The at least one further component is preferably selected from the group consisting of instructions for use, radiation source, dryer unit, digital printhead, digital printing system, primer composition, varnish composition such as underprint varnish composition, thermal dryer unit, feed devices and takeoff devices, actuating electronics and combinations of at least two of the aforementioned further components.

The radiation source may especially be a UV lamp or UV-LED lamp. The UV lamp may especially be configured as a mercury lamp, especially low-pressure mercury lamp, or as a mercury vapor lamp.

The dryer unit may especially be an LED-UV dryer unit.

The digital printhead is preferably an inkjet printhead.

The digital printing system is preferably an inkjet printing system.

The expression "underprint varnish composition" means a clear varnish composition having primer function.

With regard to further features and advantages of the kit or system, for avoidance of repetition, reference is made to the description so far, especially to the remarks made in the context of my compositions. The features and advantages described therein, especially in relation to the radiation-curable, preferably UV-curable, composition are also applicable mutatis mutandis to the kit or system.

I still yet further provide a set of inks, especially for coating, especially printing, preferably digital printing, more preferably inkjet printing, of a substrate, i.e., a print substrate or print carrier.

The set of inks comprises a multitude of radiation-curable, preferably UV-curable, compositions, i.e., two or more, for example, three, four or five, radiation-curable, preferably UV-curable, compositions, i.e., two or more, for example, three, four or five, radiation-curable, preferably UV-curable, compositions according to my compositions. These radiation-curable, preferably UV-curable, compositions may be the same or different. The radiation-curable, preferably UV-curable, compositions are preferably different compositions. More preferably, the radiation-curable, preferably UV-curable, compositions differ from one another in relation to at least one pigment and/or a pigment component (based on the total weight of the respective radiation-curable, preferably UV-curable, composition).

With regard to further features and advantages of the set of inks, for avoidance of repetition, reference is likewise made completely to the description so far, especially in relation to the remarks made in the context of my compositions. The features and advantages described therein, especially in relation to the radiation-curable, preferably UV-curable, composition are also applicable mutatis mutandis to the set of inks.

Further advantages and features of this disclosure will be apparent from the description of preferred examples. It is possible for individual features each to be implemented on their own or in combination with one another. The examples described hereinafter serve merely to further elucidate the contents of this disclosure without limiting the disclosure content of the examples.

EXAMPLES

1 Test Methods:
1.1 Printability:

The radiation-curable ink was examined and assessed for droplet formation and stable printing characteristics, i.e., without nozzle failures, by practical printing tests with an inkjet printhead. Printing stability was assessed as good if droplet formation was successful and there were no nozzle failures during the printing operation.

1.2 Machine Dishwasher Stability:

First, glasses were physically pretreated by flame treatment and silicatization. This was followed by a chemical treatment by a glass primer (e.g., Primer P5, Marabu GmbH & Co. KG). Thereafter, glasses were coated with the radiation-curing compositions by injection printing.

Machine dishwasher stability was assessed to DIN EN 12875-2.

1.3 Alcohol Stability:

A cleaning swab with a sponge was soaked with ethanol and rubbed against the surface of the radiation-cured compositions. Alcohol stability was rated as OK if no partial dissolution at the film surface was caused by the ethanol.

|  |  | Example 1 | Example 2 | Counter-example 1 | Counter-example 2 | Counter-example 3 |
|---|---|---|---|---|---|---|
| Oligomer | Urethane acrylate | 24.15 | 27.15 | 18.2 | 24.2 | 24.15 |
| Mono functional acrylate monomer | 2-Phenoxyethyl acrylate | 52.65 | 27.65 | 56.6 | 0 | 52.65 |
| Mono functional acrylate monomer | Isobornyl acrylate |  | 20 |  |  | 10 |
| Multifunctional acrylate monomer | Hexanediol acrylate | 13 | 15 | 15 | 65.6 | 3 |
| Photoinitiator | Ethyl (2,4,6-trimethylbenzoyl)-phenylphosphinate | 10 | 10 | 10 | 10 | 10 |
| Surfactant additive (levelling additive) |  | 0.1 | 0.1 | 0.1 | 0.1 | 0.1 |
| Polymeric free radical scavenger |  | 0.1 | 0.1 | 0.1 | 0.1 | 0.1 |
| Total |  | 100 | 100 | 100 | 100 | 100 |
| Properties |  |  |  |  |  |  |
| Viscosity [mPas] at 40° C. |  | 70 | 93 | 40 | 70 | 63 |
| Proportion of monofunctional monomers [%] |  | 52.65 | 47.65 | 56.6 | 0 | 62.65 |
| Proportion of multifunctional monomers [%] |  | 13 | 15 | 15 | 65.6 | 3 |
| Proportion of monofunctional and multifunctional monomers [%] |  | 65.65 | 62.65 | 71.6 | 65.6 | 65.65 |
| Ratio of sum total of monomers to oligomer |  | 2.72 | 2.31 | 3.93 | 2.71 | 2.72 |
| Printability |  | OK | OK | NOK | OK | OK |
| Machine dishwasher stability |  | OK | OK | not tested | NOK | NOK |
| Alcohol stability |  | OK | OK | OK | OK | NOK |

Examples 1 and 2 are my compositions and achieved good results in printability, machine dishwasher stability and alcohol stability.

Counterexample 1 was outside my viscosity range and did not show good printability. Machine dishwasher tests were not done for lack of useful printing results.

Counterexample 2, on account of the quantitative proportion of multifunctional acrylates, led to poor results in the machine dishwasher tests.

Counterexample 3, on account of the quantitative proportion of multifunctional acrylates, led to poor alcohol stability.

Preferred configurations are defined in the dependent claims and in the description. The wording of all claims is hereby explicitly incorporated into this description by reference.

The invention claimed is:

1. A radiation-curable composition comprising:
   at least one monofunctional acrylate monomer and/or methacrylate monomer and/or at least one monofunctional acrylamide monomer,
   at least one multifunctional acrylate monomer and/or methacrylate monomer, and
   at least one oligomer and/or at least one polymer,
   wherein the composition at 40° C. has a viscosity of ≥50 mPa,
   wherein the radiation-curable composition further comprises at least one N-vinylamide monomer and/or at least one vinyl acrylate monomer selected from the group consisting of N-vinylcaprolactam, N-vinylpyrrolidone, vinylmethyl-oxazolidinone (VMOX), 2-(2-vinyloxyethoxy)ethyl acrylate (VEEA), 2-(2-vinyloxyethoxy)ethyl methacrylate and mixtures of at least two of the monomers.

2. The radiation-curable composition according to claim 1, wherein the composition at 40° C. has a viscosity of 50 mPas to 150 mPas.

3. The radiation-curable composition according to claim 1, wherein the at least one monofunctional acrylate monomer and/or methacrylate monomer is selected from the group consisting of 2-phenoxyethyl acrylate, isobornyl acrylate, n-octyldecyl acrylate, cyclic trimethylol-propane formal acrylate, lauryl acrylate, alkoxylated lauryl acrylate, isodecyl acrylate, caprolactone acrylate, 3,3,5-trimethylcyclohexyl acrylate, 4-hydrox-ybutyl acrylate, isooctyl acrylate, 2-(2-ethoxyethoxy)ethyl acrylate, butyl acrylate, benzyl acrylate, 2-(1,1-dimethylethyl)cyclohexyl acrylate, 3-(1,1-dimethylethyl)cyclohexyl acrylate, 4-(1,1-dimethylethyl)cyclohexyl acrylate, ethoxylated phenyl acrylate, alkoxylated nonylphenol acrylate, O-phenylphenoxyethyl acrylate, phenoxybenzyl acrylate, trimethylcyclohexyl acrylate, tridecyl acrylate, 4-tert-butylcyclohexyl acrylate, behenyl acrylate, stearyl acrylate, isobornyl methacrylate, 4-tert-butylcyclohexyl methacrylate, lauryl methacrylate, isodecyl methacrylate, 2-phenoxyethyl methacrylate, isooctyl methacrylate, benzyl methacrylate, cyclohexyl methacrylate, 3,3,5-trimethylcyclohexyl methacrylate, alkoxylated nonylphenol methacrylate, hydroxyethyl methacrylate, 2-N-morpholinoethyl methacrylate and mixtures of at least two of the aforementioned monofunctional acrylate monomers and/or methacrylate monomers.

4. The radiation-curable composition according to claim 1, wherein the at least one monofunctional acrylate monomer and/or methacrylate monomer and/or at least one acrylamide monomer has a proportion of 20% by weight to 80% by weight, based on the total weight of the composition.

5. The radiation-curable composition according to claim 1, wherein the at least one multifunctional acrylate monomer and/or methacrylate monomer is selected from the group consisting of (octahydro-4,7-methano-1H-indenediyl)bis(methylene) diacrylate, esterdiol diacrylate, tris(2-hydroxyethyl) isocyanurate triacrylate, trimethylolpropane triacrylate, alkoxylated trimethylolpropane triacrylate, glycerol propoxylate triacrylate, pentaerythritol triacrylate, dipentaerythritol pentaacrylate, dipentaerythritol hexaacrylate, ethoxylated pentaerythritol tetraacrylate, pentaerythritol tetraacrylate, ditrimethylolpropane tetraacrylate, polyethylene glycol diacrylates, 1,2-ethylene glycol dimethacrylate, dodecane-1,12-diol dimethacrylate, tris(2-hydroxyethyl) isocyanurate trimethacrylate, hexanediol dimethacrylate, ethoxylated bisphenol A dimethacrylate, trimethylolpropane trimethacrylate, pentaerythritol tetramethacrylate and mixtures of at least two of the aforementioned multifunctional acrylate monomers and/or methacrylate monomers.

6. The radiation-curable composition according to claim 1, wherein the at least one multifunctional acrylate monomer and/or methacrylate monomer has a proportion of 5% by weight to 40% by weight, based on the total weight of the composition.

7. The radiation-curable composition according to claim 1, wherein the at least one monofunctional acrylamide monomer is 4-acryloylmorpholine.

8. The radiation-curable composition according to claim 1, wherein the at least one oligomer has a proportion of 10% by weight to 50% by weight, based on the total weight of the composition.

9. The radiation-curable composition according to claim 1, wherein the at least one oligomer is at least one reactive oligomer, at least one acrylate oligomer and/or at least one methacrylate oligomer, selected from the group consisting of epoxy acrylates, polyester acrylates, aliphatic urethane acrylates, aromatic urethane acrylates, polyether acrylates, silicone acrylates, melamine acrylates, dendritic acrylates, amine-modified acrylates, epoxy methacrylates, polyester methacrylates, aliphatic urethane methacrylates, aromatic urethane methacrylates, polyether methacrylates, silicone methacrylates, melamine methacrylates, dendritic methacrylates, amine-modified methacrylates and mixtures of at least two of the aforementioned oligomers.

10. The radiation-curable composition according to claim 1, having a proportion of the at least one monofunctional acrylate monomer and/or methacrylate monomer and/or at least one acrylamide monomer and the at least one multifunctional acrylate monomer and/or methacrylate monomer to the at least one oligomer of <4:1.

11. A method of coating or printing a substrate, comprising:
a) applying in at least one layer, the radiation-curable composition according to claim 1 to a surface of the substrate, and
b) curing the radiation-curable composition applied by action of electromagnetic radiation or UV radiation.

12. A substrate coated or printed with the radiation-cured or UV-cured composition according to claim 1.

13. A radiation-curable composition comprising:
at least one monofunctional acrylate monomer and/or methacrylate monomer and/or at least one monofunctional acrylamide monomer,
at least one multifunctional acrylate monomer and/or methacrylate monomer, and at least one polymer,
wherein the composition at 40° ° C. has a viscosity of >50 mPas,
wherein the at least one polymer has a proportion of 10% by weight to 50% by weight, based on the total weight of the composition, and/or the at least one polymer has a weight-average molecular weight of >30,000 Da, and/or the at least one polymer has a glass transition temperature of 25° C. to 105° C., and/or
the at least one polymer is at least one non-radiation-curable polymer and/or at least one radiation-curable polymer selected from the group consisting of epoxy resin, polyester resin, vinyl resin, ketone resin, aldehyde resin, nitrocellulose resin, phenoxy resin, acrylate resin and mixtures of at least two of the aforementioned polymers.

14. The radiation-curable composition according to claim 3, wherein the alkoxylated lauryl acrylate is ethoxylated lauryl acrylate.

15. The radiation-curable composition according to claim 5, wherein the esterdiol diacrylate is selected from the group consisting of tricyclodecanedi-methanol diacrylate, butanediol diacrylate, 1,2-ethylene glycol diacrylate, dodecane-1,12-diol diacrylate, decane-1,10-diol diacrylate, esterdiol diacrylate, propoxylated 2-neopentyl glycol diacrylate, propoxylated neopentyl glycol diacrylate, hexanediol diacrylate, tripropylene glycol diacrylate, tetraethylene glycol diacrylate, dipropylene glycol diacrylate, alkoxylated hexanediol diacrylate, 3-methylpentane-1,5-diol diacrylate, alkoxylated cyclohexane-dimethanol diacrylate, and mixtures of at least two of the aforementioned esterdiol diacrylates.

16. The radiation-curable composition according to claim 5, wherein the alkoxylated trimethylolpropane triacrylate is ethoxylated trimethylolpropane triacrylate.

17. The radiation-curable composition according to claim 13, wherein the at least one monofunctional acrylamide monomer is 4-acryloylmorpholine.

18. The radiation-curable composition according to claim 13, wherein the at least one monofunctional acrylate monomer and/or methacrylate monomer is selected from the group consisting of 2-phenoxyethyl acrylate, isobornyl acrylate, n-octyldecyl acrylate, cyclic trimethylol-propane formal acrylate, lauryl acrylate, alkoxylated lauryl acrylate, isodecyl acrylate, caprolactone acrylate, 3,3,5-trimethylcyclohexyl acrylate, 4-hydrox-ybutyl acrylate, isooctyl acrylate, 2-(2-ethoxyethoxy)ethyl acrylate, butyl acrylate, benzyl acrylate, 2-(1,1-dimethylethyl)cyclohexyl acrylate, 3-(1,1-dimethylethyl)cyclohexyl acrylate, 4-(1,1-dimethylethyl)cyclohexyl acrylate, ethoxylated phenyl acrylate, alkoxylated nonylphenol acrylate, O-phenylphenoxyethyl acrylate, phenoxybenzyl acrylate, trimethylcyclohexyl acrylate, tridecyl acrylate, 4-tert-butylcyclohexyl acrylate, behenyl acrylate, stearyl acrylate, isobornyl methacrylate, 4-tert-butylcyclohexyl methacrylate, lauryl methacrylate, isodecyl methacrylate, 2-phenoxyethyl methacrylate, isooctyl methacrylate, benzyl methacrylate, cyclohexyl methacrylate, 3,3,5-trimethylcyclohexyl methacrylate, alkoxylated nonylphenol methacrylate, hydroxyethyl methacrylate, 2-N-morpholinoethyl methacrylate and mixtures of at least two of the aforementioned monofunctional acrylate monomers and/or methacrylate monomers.

* * * * *